United States Patent
Ueki

(10) Patent No.: US 6,997,339 B2
(45) Date of Patent: Feb. 14, 2006

(54) CAP DEVICE FOR FUEL TANK

(75) Inventor: Yasushi Ueki, Yokohama (JP)

(73) Assignee: Nifco Inc., Yokohama (JP)

( * ) Notice: Subject to any disclaimer, the term of this patent is extended or adjusted under 35 U.S.C. 154(b) by 158 days.

(21) Appl. No.: 10/419,142

(22) Filed: Apr. 21, 2003

(65) Prior Publication Data

US 2004/0000553 A1 Jan. 1, 2004

(30) Foreign Application Priority Data

Jul. 1, 2002 (JP) .................................. 2002-192184

(51) Int. Cl.
*B65D 41/06* (2006.01)

(52) U.S. Cl. ............................... 220/293; 220/DIG. 33
(58) Field of Classification Search ................ 220/293, 220/DIG. 32, 303, 304, DIG. 33
See application file for complete search history.

(56) References Cited

U.S. PATENT DOCUMENTS

| | | | | | |
|---|---|---|---|---|---|
| 4,436,219 | A | * | 3/1984 | Reutter ........................ 220/295 |
| 5,108,001 | A | * | 4/1992 | Harris .................... 220/203.06 |
| 5,110,003 | A | * | 5/1992 | MacWilliams .............. 220/304 |
| 5,183,173 | A | * | 2/1993 | Heckman ............... 220/203.07 |
| 5,395,004 | A | * | 3/1995 | Griffin et al. ................ 220/295 |
| 5,480,055 | A | * | 1/1996 | Harris et al. ........... 220/203.26 |
| 5,615,793 | A | * | 4/1997 | Muller ........................ 220/295 |
| 5,638,975 | A | * | 6/1997 | Harris ......................... 220/288 |
| 5,791,507 | A | * | 8/1998 | Harris et al. ........... 220/203.26 |
| RE36,557 | E | * | 2/2000 | Brown ......................... 220/323 |
| 6,095,363 | A | * | 8/2000 | Harris et al. ........... 220/203.26 |
| 6,179,148 | B1 | * | 1/2001 | Harris ......................... 220/288 |
| 6,213,331 | B1 | * | 4/2001 | Morgan et al. ............. 220/295 |
| 6,705,483 | B1 | * | 3/2004 | Hagano et al. ............. 220/303 |
| 6,739,472 | B1 | * | 5/2004 | Newport ..................... 220/293 |

\* cited by examiner

*Primary Examiner*—Lee Young
*Assistant Examiner*—James Smalley
(74) *Attorney, Agent, or Firm*—Manabu Kanesaka

(57) ABSTRACT

In a cap device for a fuel tank, a main portion includes an operation portion, a sealing member and an engaging portion. When the main portion is inserted into an opening portion of the fuel tank and rotated by a predetermined angle, the sealing member is pressed against the opening portion and the engaging portion engages the opening portion, thereby fixing the cap device to the opening portion. The main portion also includes a shaft portion, a movable member having the engaging portion, and a cam mechanism disposed between the shaft portion and the movable member for allowing the shaft port ion to move separately from the movable member, so that the engaging portion engages the opening portion according to the vertical movement of the shaft portion through the cam mechanism.

8 Claims, 16 Drawing Sheets

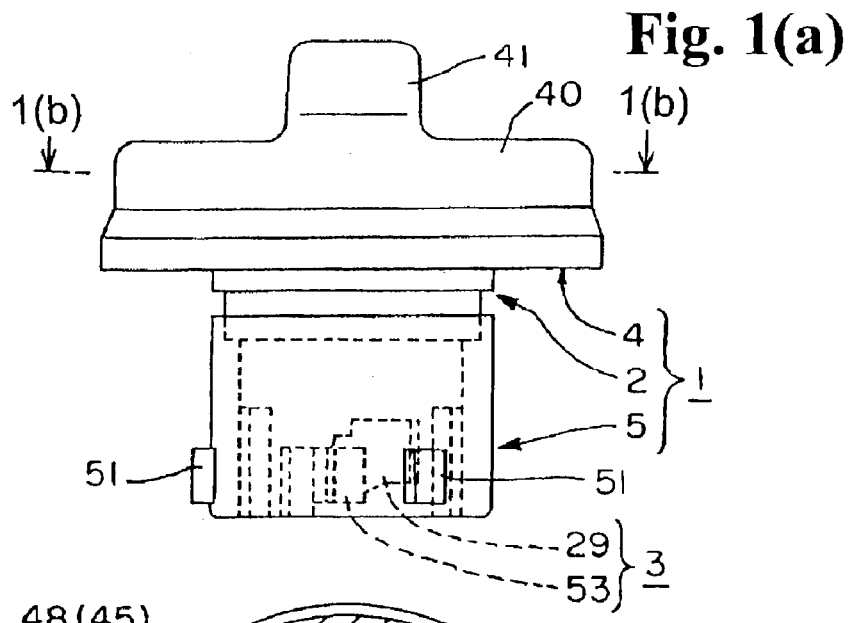

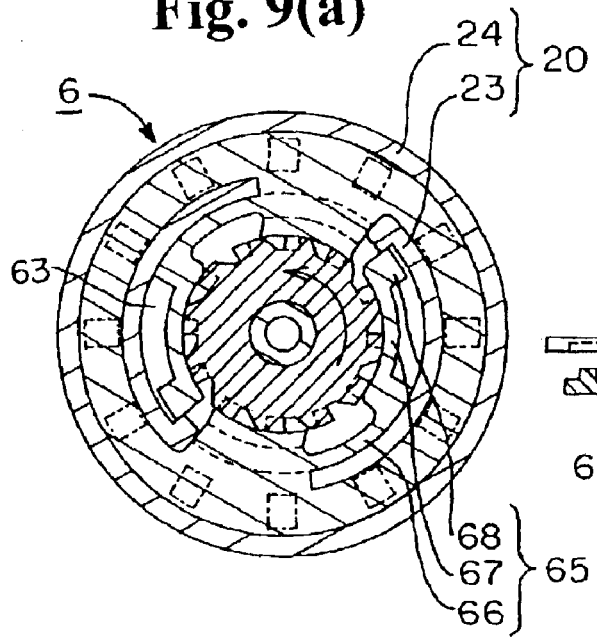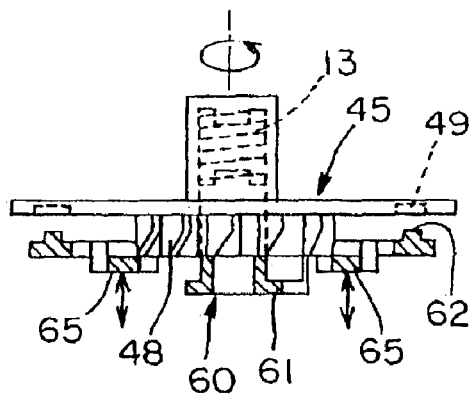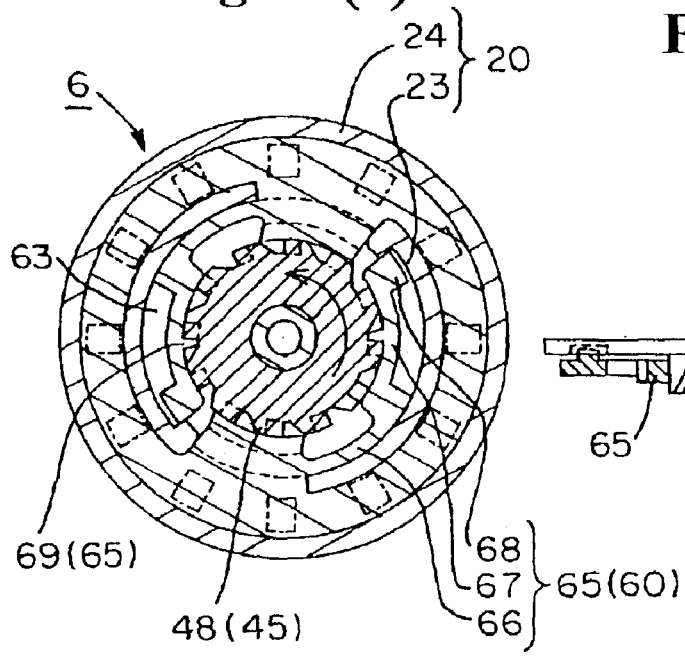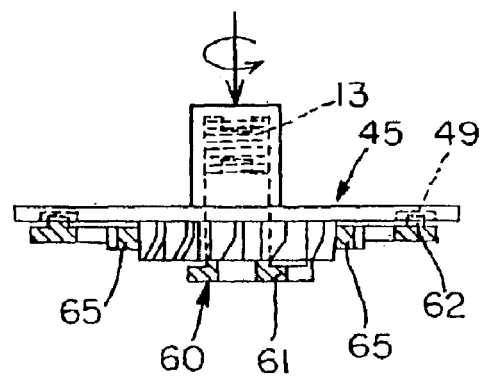

Fig. 13(a)
Fig. 13(b)
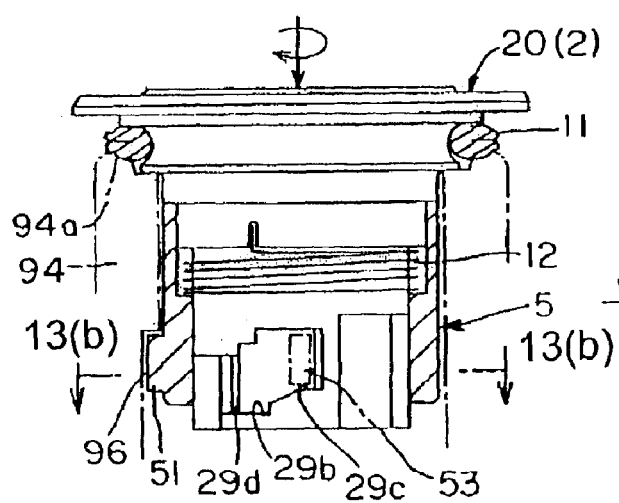
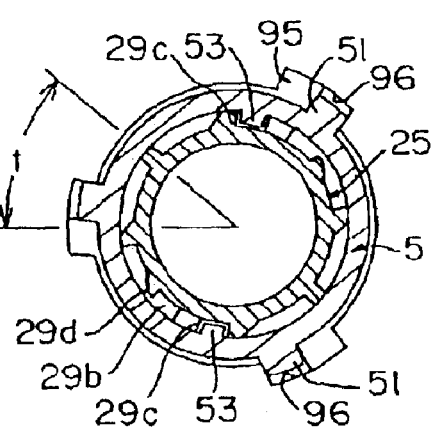

CAP DEVICE FOR FUEL TANK

BACKGROUND OF THE INVENTION AND RELATED ART STATEMENT

The invention relates to a cap device used for various types of fuel tanks installed in, for example, an automobile for opening and closing an opening portion of the tank.

FIGS. 20(a) and 20(b) show a conventional cap device disclosed in Japanese Patent Publication (TOKKAI) No. 2001-348050. As shown in FIG. 20(a), a cap device 80 includes a main portion 81 having a cover 84 rotatably attached to an upper flange 83 of a shaft portion 82, and a torque mechanism 85 disposed between the upper flange 83 and the cover 84. The main portion 81 also includes a sealing member 86 mounted on an upper side of the shaft portion 82 and a projection 87 disposed on a lower side of the shaft portion 82 as an engaging portion.

As shown in FIG. 20(b), when the main portion 81 is inserted into an opening portion 91 of a tank 90 along an insertion notch 92, and is rotated by a predetermined angle (90°) in a closing direction from the inserted state, the sealing member 86 is pressed against an edge 91a of the opening portion 91 while deforming, and the projection 87 engages the engaging portion (a lower surface of a step) 93 inside the opening portion (a cap mounted state). Also, the projection 87 is formed of the first inclined surface 87a having a large angle and the second inclined surface 87b having a medium angle relative to the engaging portion 93, so that a rotational torque is changed from an initial stage to a later stage when it is rotated by the predetermined angle in the closing direction. The torque mechanism 85 includes an engaging portion (not shown) provided on the cover 84, a torque plate 88, and a spring. A reference symbol V represents a valve mechanism for controlling a pressure in the tank.

In the above structure of the conventional device, when the main portion 81 is rotated by the predetermined angle, at the beginning, the first inclined surface 87a is designed to have the large angle to prevent the rotational torque from becoming a large load due to the deformation of the sealing member 86, and in the final stage, the second inclined surface 87b is designed to have the medium angle to ensure the sealing. Further, instead of a latching structure where a cover rotates without resistance with respect to the main portion, the torque mechanism 85 is provided to create a resistance when the cover 84 receives a rotational torque larger than a predetermined torque, thereby securing the cap mounted state. Also, the cover 84 can be returned to the initial position with respect to the main portion 81 due to an urging force and a releasing operation of the spring of the torque mechanism.

Incidentally, for the fuel tank installed in the automobile, since the cap device 80 is frequently opened or closed, it is important that the cap device 80 is easy to detach and has a long life without abrasion and deterioration. Also, when the cap device 80 receives an improvident force due to a collision, accident or the like, it is important to prevent the fuel from leaking due to the force in the opening direction as well as damage due to the force in the closing direction. In the cap device 80 as described above, the abrasion and deterioration less likely occur as compared with a screw type, and it is easy to detach. However, it is preferable that the cap device can be operated with a lower force while maintaining the sealing for women and senior people, since the self-fueling system becomes more popular. Also, the conventional cap device does not meet sufficient reliability when the improvident force in the opening direction as described above is applied.

In view of the above problems, the present invention has been made, and an object of the invention is to provide a cap device for the fuel tank, wherein the cap device can be detached with a greatly reduced force in one-touch operation, even when the engaging portion of the cap engages the opening portion with a large force.

Another object of the invention is to provide a cap device for the fuel tank, wherein even when the improvident force is applied, the engaging portion of the cap is not disengaged from the engaging portion of the opening portion, thereby securely preventing the fuel leakage and improving the reliability.

Further objects and advantages of the invention will be apparent from the following description of the invention.

SUMMARY OF THE INVENTION

In order to achieve the objects described above, according to the first aspect of the invention, a cap device for a fuel tank includes a main portion having an operating portion, a sealing member located below the operating portion and engaging portions located below the sealing member. When the main portion is inserted into an opening portion of the fuel tank and rotated by a predetermined angle, the sealing member is pressed against an edge of the opening portion, and the engaging portions of the cap device engage an engaging portion inside the opening portion with an increased torque, thereby attaching the cap device to the opening portion of the fuel tank. Further, the main portion includes a shaft portion provided with the sealing member, a movable member attached to the shaft portion and having the engaging portions, and a cam mechanism disposed between the shaft portion and the movable member for allowing the shaft portion to move vertically with respect to the movable member through an operation of the operating portion. The engaging portions of the cap device engage and disengage the engaging portions inside the opening portion through the cam mechanism while the shaft portion moves vertically relative to the movable member.

The invention described above is specified based on the engagement structure between the main portion and the opening portion. In the structure, the shaft portion has the movable member moving vertically through the cam mechanism. When the shaft portion is inserted into the opening portion along an insertion notch and rotated by a predetermined angle through the operating portion from the inserted state in the closing direction, the engaging portion of the main portion engages the engaging portion of the opening portion in an initial engaging state. When the shaft portion is further rotated through the operating portion, the engaging portion of the main portion is tightened with an increased torque in a final engaging state while moving downward with respect to the movable member. In the course of reaching the final engagement state, while the conventional structure requires the maximum rotational torque, in the present invention, the cam mechanism is located closer to a rotational center than the engaging portions to reduce the rotational torque, thereby allowing smooth rotating operation and improving the attaching operation.

According to the second aspect of the invention, a cam mechanism includes a cam groove portion, a cam projection, and an urging member for urging a movable member downward. The cam groove portion is provided in a shaft portion, and the cam projection is provided in the movable member to fit the cam groove portion. The urging member is disposed between the shaft portion and the movable member, thereby reducing the number of the parts and facilitating production.

According to the third aspect of the invention, in a cap device for a fuel tank, a main portion includes an operating portion at an upper side thereof, a sealing member disposed below the operating portion, and engaging portions disposed below the sealing member. When the main portion is inserted into an opening portion of the fuel tank and rotated by a predetermined angle, the sealing member is pressed against an edge of the opening portion, and the engaging portions of the cap device engage an engaging portion inside the opening portion with an increased torque, thereby attaching the cap device to the opening portion of the fuel tank. Further, the operating portion includes a cover rotatably attached to an upper flange portion of the main portion, and a connecting mechanism disposed between the upper flange portion of the main portion and the cover for allowing the cover to selectively connect to the main portion. Through the connecting mechanism, the cover can switch between a non-connecting mode in which the cover rotates without resistance relative to the main portion and a connecting mode in which the cover rotates with the main portion depending on whether the cover is pressed downward with respect to a rotational torque in the opening direction.

The invention described above is specified from a view point of the connecting mechanism installed between the main portion and the cover. In the structure, when the cap is mounted, the cover is in the non-connecting mode with respect to the main portion through the connecting mechanism. Therefore, since the cover rotates without resistance with respect to the main portion, the main portion does not rotate when an improvident force is applied to the cover in the opening direction due to a collision an the like, thereby preventing disengagement and fuel leakage.

In the fourth aspect of the invention, a connecting mechanism includes teeth portions (for example, teeth portion formed in a substantially outer gear shape) provided on a cover; an engaging piece having a projection and provided on an upper flange portion for engaging the projection with a corresponding portion of the teeth portion; and a spring member for urging the teeth portion in a direction away from the upper flange portion. Alternatively, in a case that a molding die meets a certain level of accuracy, it is possible that the teeth portion is formed inside the cover; the engaging piece is formed on the upper flange portion; and the spring member is formed of an upright elastic piece provided on the cover or the upper flange portion. Therefore, with the structure described above, the number of parts can be minimized.

According to the fifth aspect of the invention, an engaging piece is provided in a connecting plate attached to an upper flange portion. An engagement between the teeth portion and the projection is released when the cover device is in a non-connecting mode or the cover is rotated in the closing direction with a torque larger than a predetermined value. The engaging piece swings in different directions to release the engagement in the non-connecting mode and the engagement upon rotating the cover in the closing direction. With this structure, it is possible to prevent damaging the cover when rotated in the closing direction due to an improvident force. Also, the connecting mechanism does not need a large space between the main portion and the cover, thereby reducing a size of the device.

In the sixth aspect of the invention, all of the previous aspects described above are combined, thereby utilizing advantages of the cam mechanism and the connecting mechanism at the same time.

In the invention described above, the engaging portion is formed inside the opening portion of the tank, and is formed of, for example, a horizontal groove with respect to a vertical groove insertion notch along which the engaging portion of the cap device is inserted. The engaging portion of the cap device moves along a step surface (substantially extending horizontally from the vertical groove of the insertion notch, or gradually inclining downward away from the insertion notch, and so on), and is increasingly tightened until it is engaged (locked) with a predetermined strength. The engaging portion of the cap device may be formed in a groove shape, and the engaging portion of the opening may be formed in a projecting shape. "Engagement by the increased tightening" is used to differentiate from an engagement, for example, of an elastic claw that elastically engages an engaging portion, so called "snap fit". In short, the engaging portion of the cap device achieves the final engaging state from the initial engaging state by being rotated further in the direction where the engaging force is increased.

BRIEF DESCRIPTION OF THE DRAWINGS

FIGS. 1(*a*) to 1(*c*) are structural views showing a cap device of the first embodiment according to the present invention;

FIGS. 9(*a*) to 9(*b*) are drawings for explaining the connecting mechanism as shown in FIGS. 7(*a*) to 7(*b*);

FIGS. 10(*a*) to 10(*b*) are drawings for explaining the connecting mechanism as shown in FIGS. 7(*a*) to 7(*b*);

FIGS. 13(*a*) to 13(*b*) are drawings for explaining the cam mechanism of the cap device;

DETAILED DESCRIPTION OF PREFERRED EMBODIMENTS

Hereunder, preferred embodiments of the invention will be described with reference to the accompanying drawings. FIGS. 1(*a*)–13(*b*) show the first embodiment of the invention, and FIGS. 14(*a*)–19(*b*) show the second embodiment of the invention.

Figure 2A:
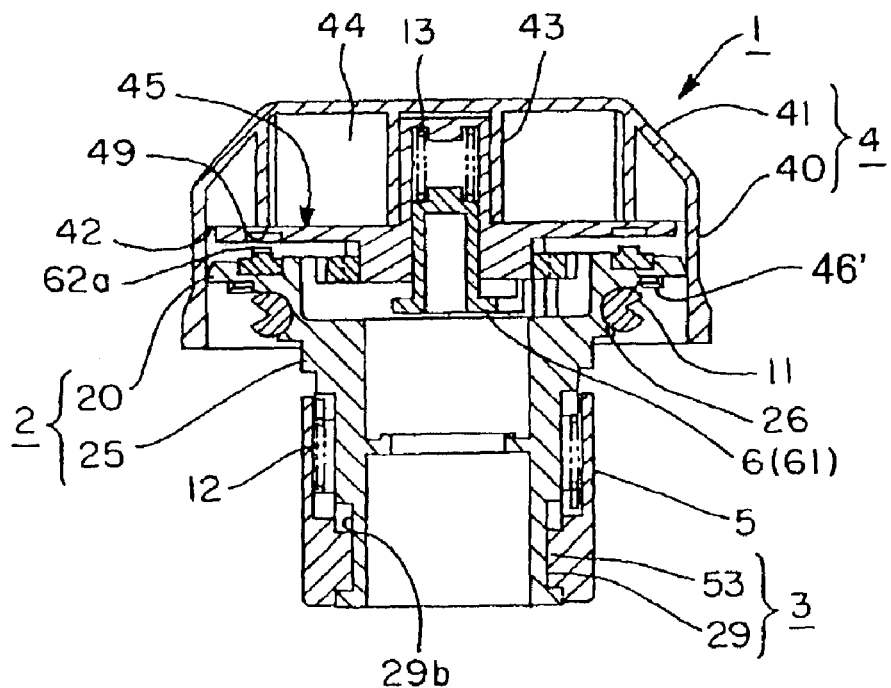
FIGS. 2(*a*) to 2(*b*) are sectional views of the cap device in FIGS. 1(*a*) to 1(*c*)
Figure 2B:
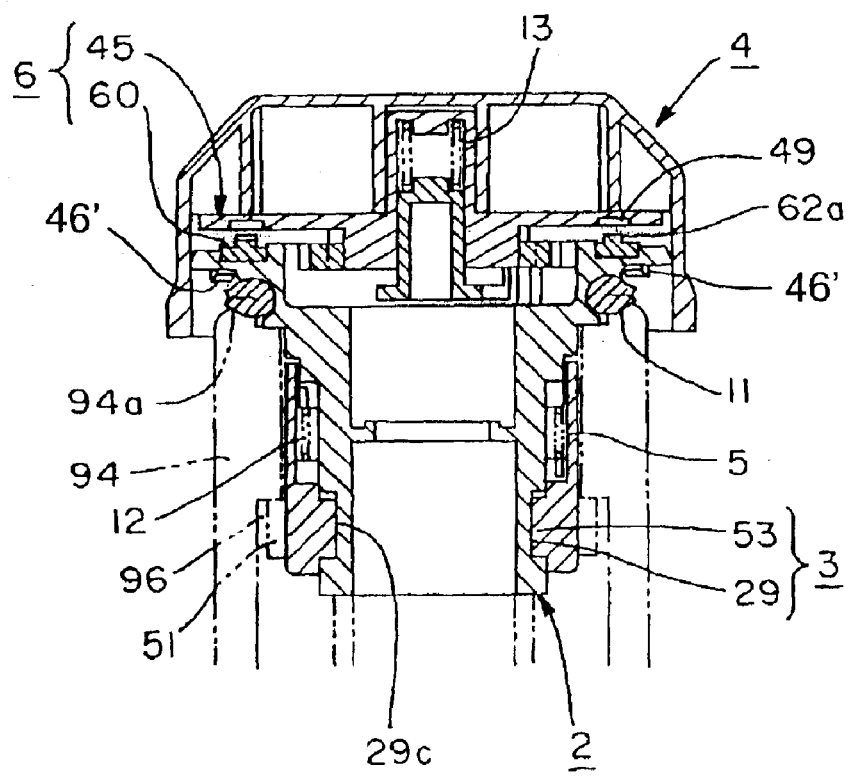
Figure 3:
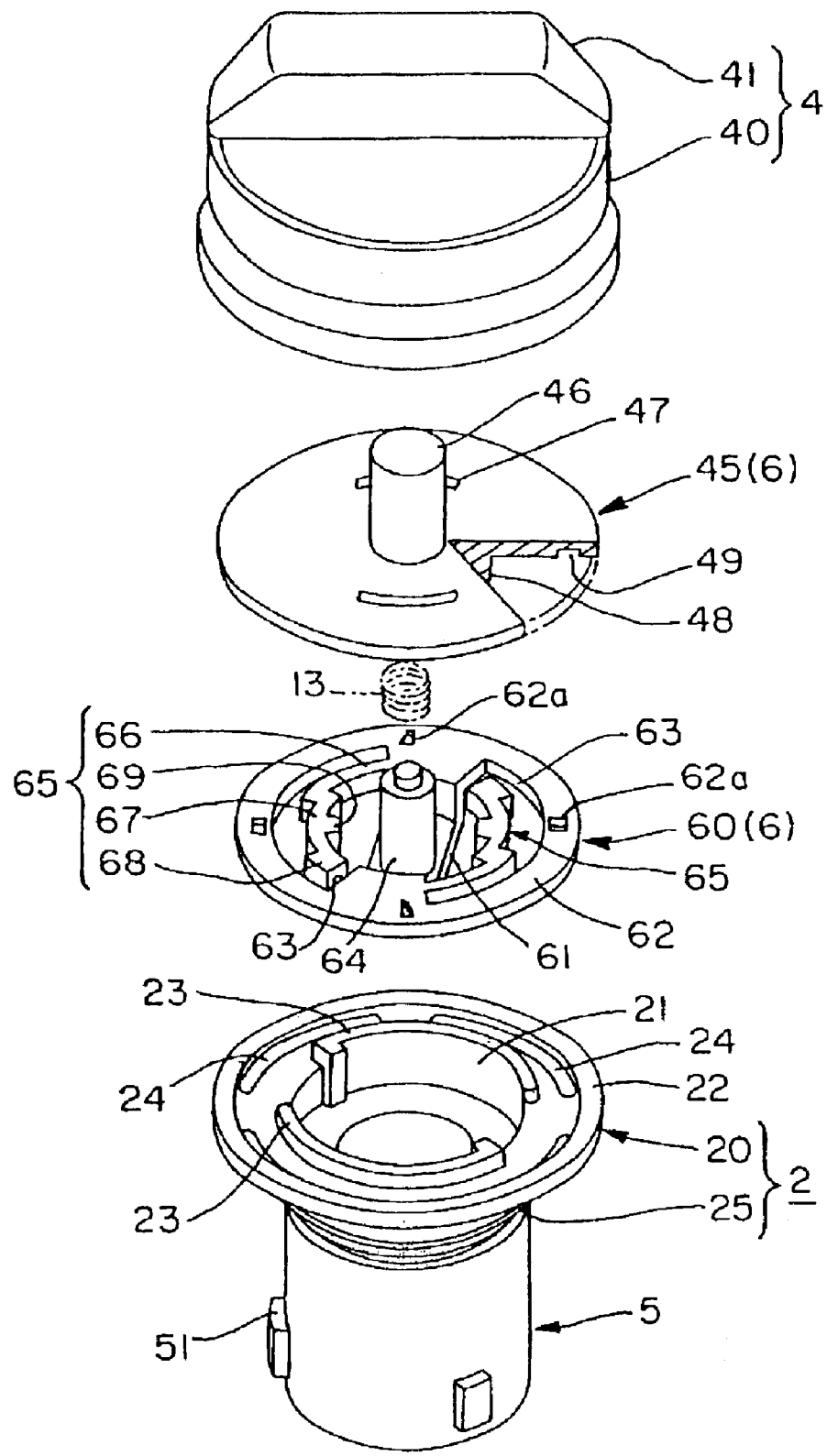
FIG. 3 is an exploded perspective view showing geometric relationships among members shown in FIGS. 1(*a*) to 1(*c*)
Figure 4:
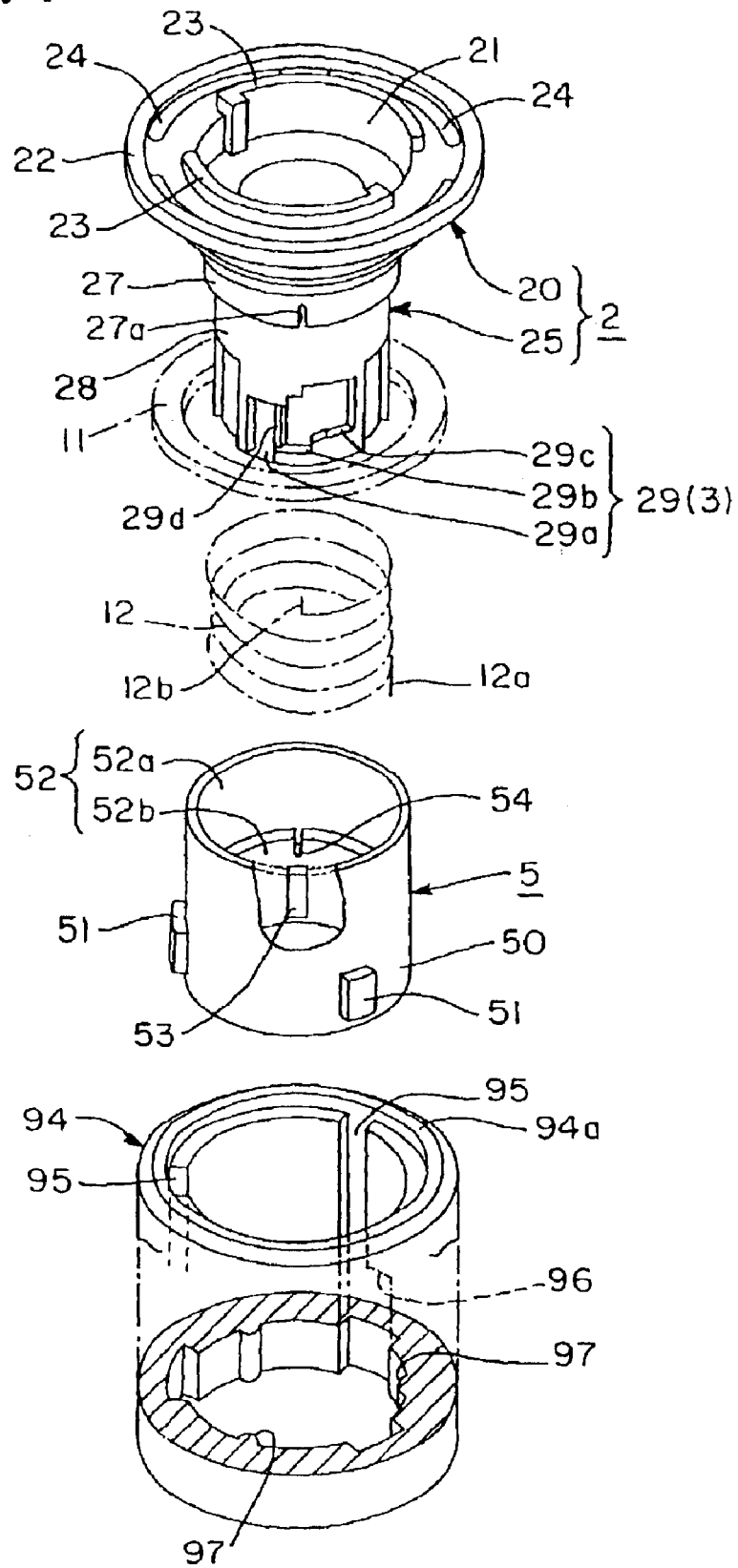
FIG. 4 is an exploded perspective view showing a relationship between the members in FIGS. 1(*a*) to 1(*c*) and a fuel tank.

FIG. 1(*a*) is a front view of a cap device, FIG. 1(*b*) is a sectional view thereof taken along line 1(*b*)–1(*b*) in FIG. 1(*a*), and FIG. 1(*c*) is a bottom view thereof. FIG. 2(*a*) is a vertical sectional view of the cap device, and FIG. 2(*b*) is a vertical sectional view in a state that the cap device engages an opening portion of a fuel tank through an increased tightening. FIGS. 3 and 4 are exploded perspective views showing constituent members, respectively. FIG. 5(*a*) is a bottom view of a rotary table, FIG. 5(*b*) is a side view thereof, and FIG. 5(*c*) is a sectional view thereof taken along line 5(*c*)—5(*c*) in FIG. 5(*a*). FIG. 6(*a*) is a top view of a connecting plate, FIG. 6(*b*) is a side view thereof, and FIG. 6(*c*) is a sectional view thereof taken along line 6(*c*)—6(*c*) in FIG. 6(*a*). FIGS. 7(*a*), 7(*b*) to 10(*a*), 10(*b*) show operations of a connecting mechanism, wherein FIGS. 7(*a*), 8(*a*), 9(*a*) and 10(*a*) are schematic views showing respective members hatched separately, and FIGS. 7(*b*), 8(*b*), 9(*b*) and 10(*b*) are schematic views showing a relationship between the rotary table and the connecting plate.

Figure 11A:
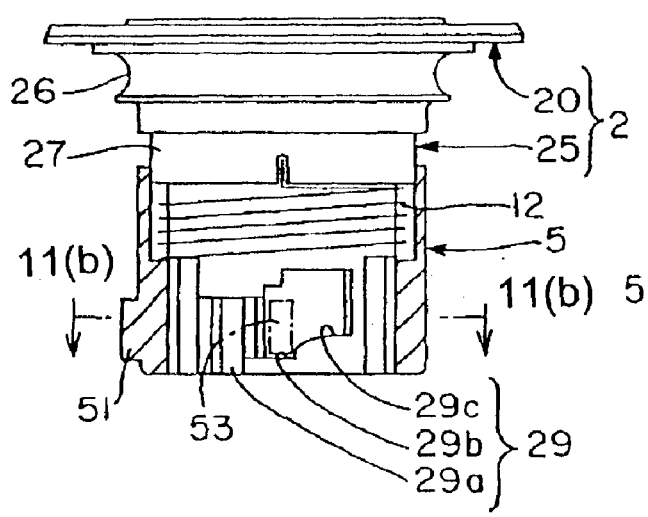
FIGS. 11(*a*) to 11(*b*) are drawings for explaining a cam mechanism of the cap device.
Figure 11B:
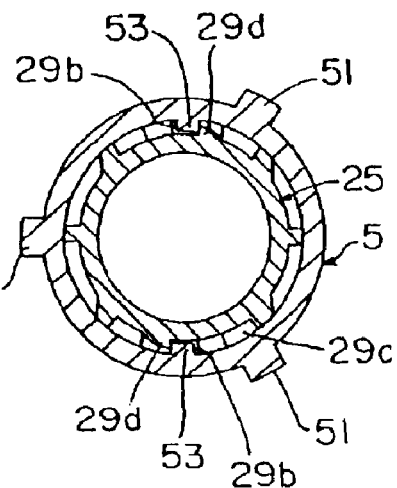

FIGS. 11(*a*), 11(*b*) to 13(*a*), 13(*b*) show operations of a cam mechanism, wherein FIGS. 11(*a*), 12(*a*) and 13(*a*) are schematic views showing the device itself and a relationship between the device and the tank-side opening, and FIGS. 11(*b*), 12(*b*) and 13(*b*) are sectional views taken along lines 11(*b*)—11(*b*), 12(*b*)—12(*b*) and 13(*b*)—13(*b*), respectively.

Figure 14A:
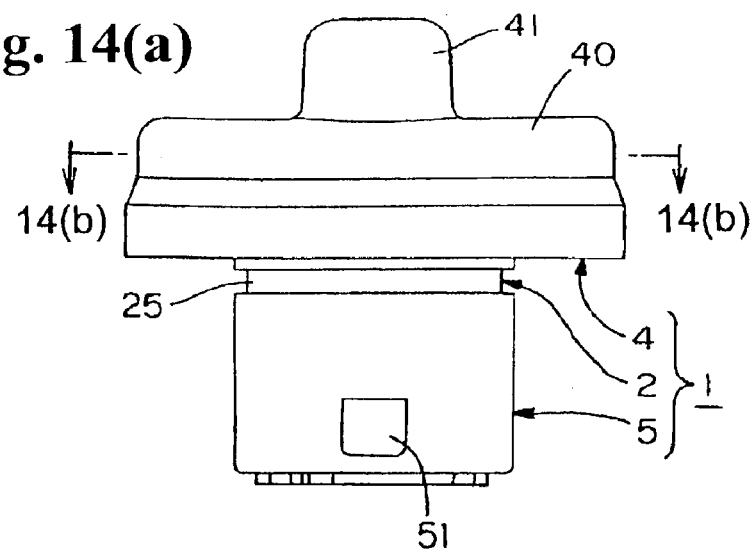
FIGS. 14(*a*) to 14(*c*) are structural drawings for showing a cap device according to the second embodiment.
Figure 14B:
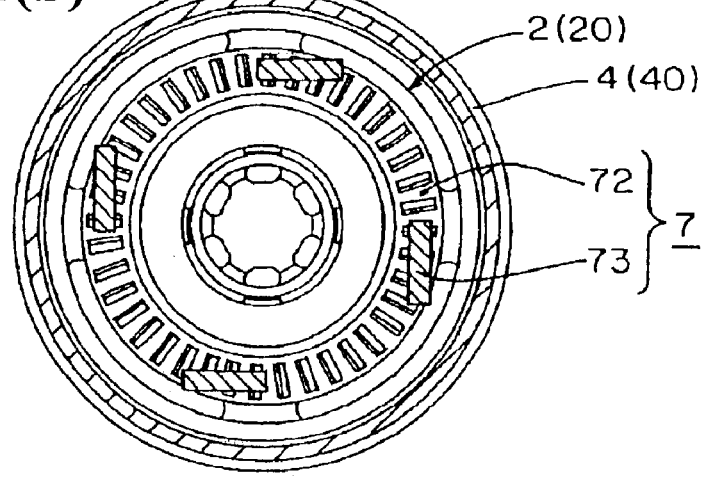
Figure 14C:
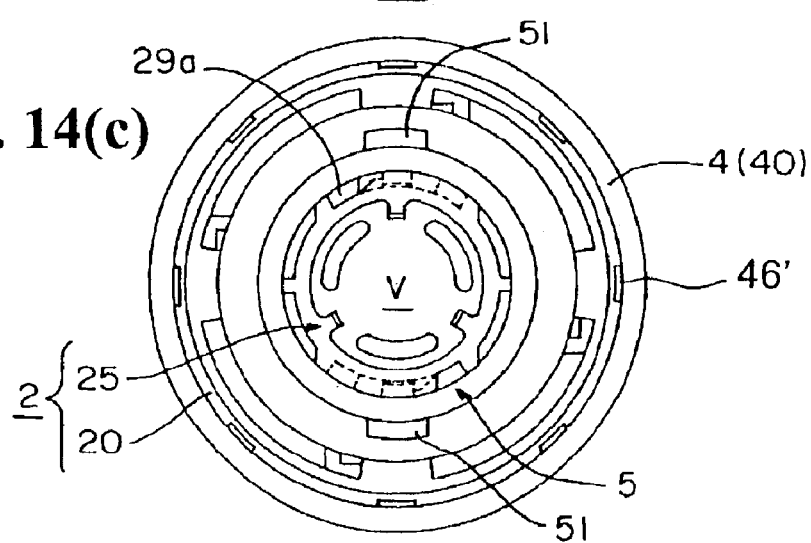
Figure 15A:
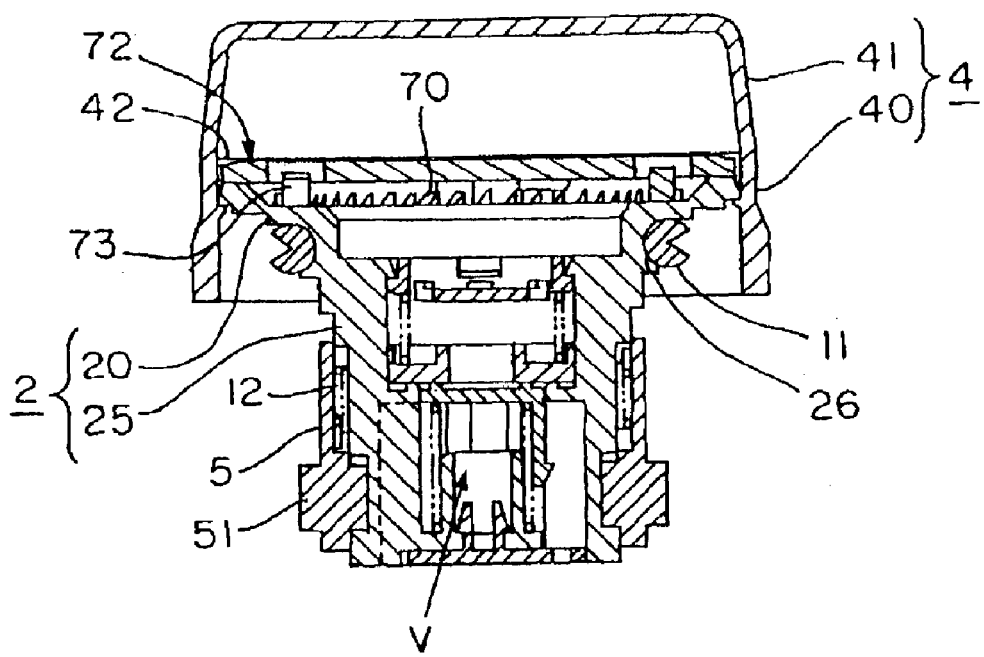
FIGS. 15(*a*) and 15(*b*) are vertical sectional views of the cap device shown in FIGS. 14(*a*) to 14(*c*)
Figure 15B:
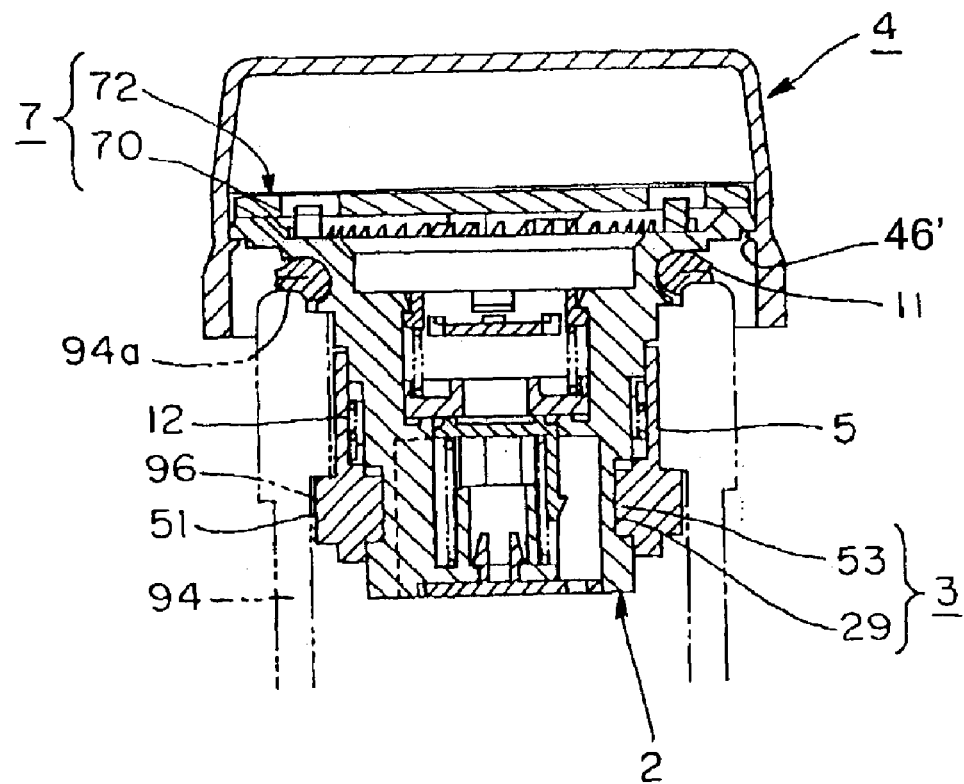
Figure 16:
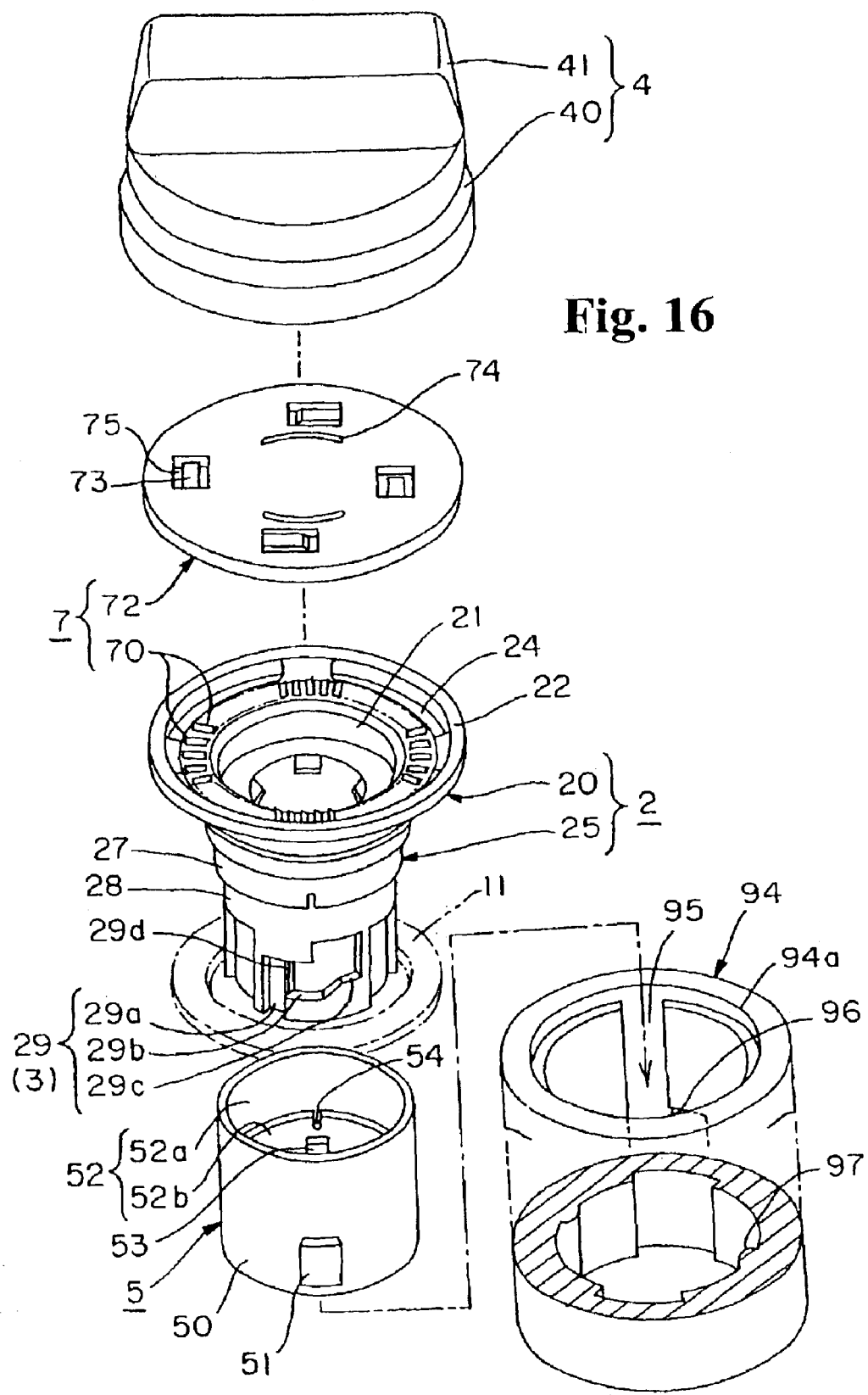
FIG. 16 is an exploded perspective view showing relationships among members shown in FIGS. 14(*a*) to 14(*c*) and the fuel tank.
Figure 17A:
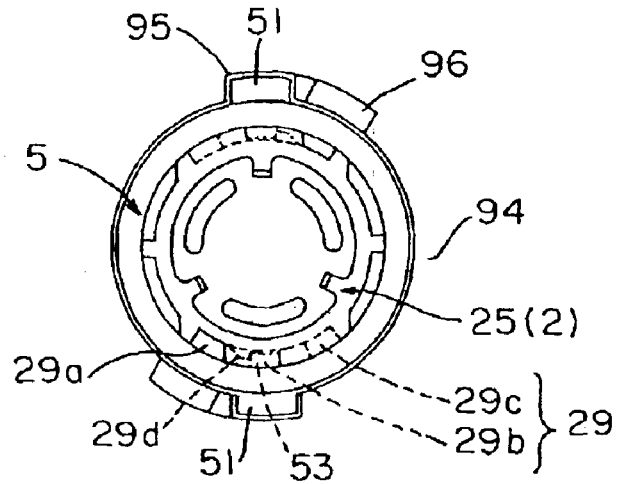
FIGS. 17(*a*) to 17(*c*) are drawings for explaining a cam mechanism shown in FIGS. 14(*a*) to 14(*c*)
Figure 17B:
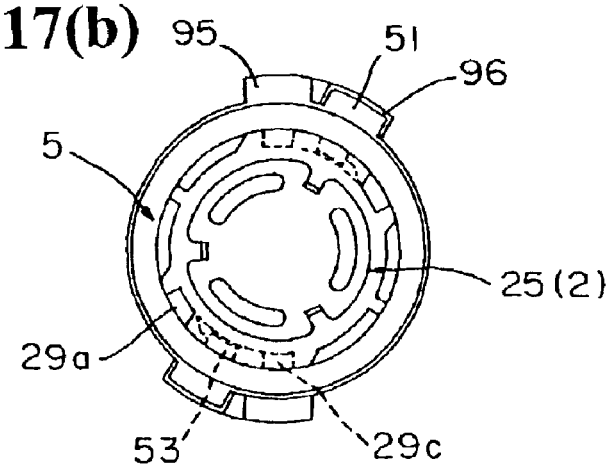
Figure 17C:
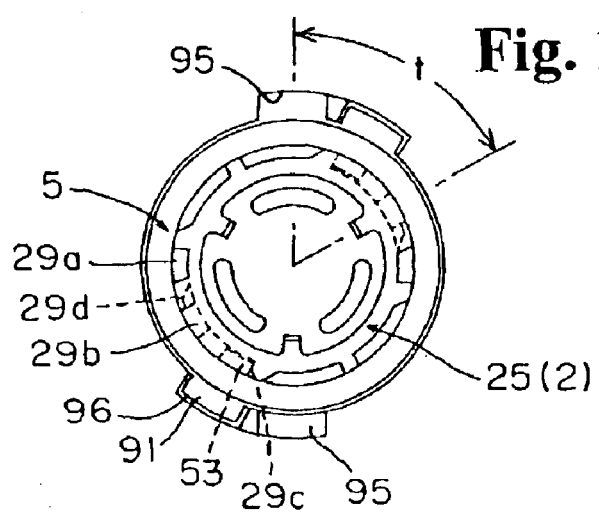
Figure 18:
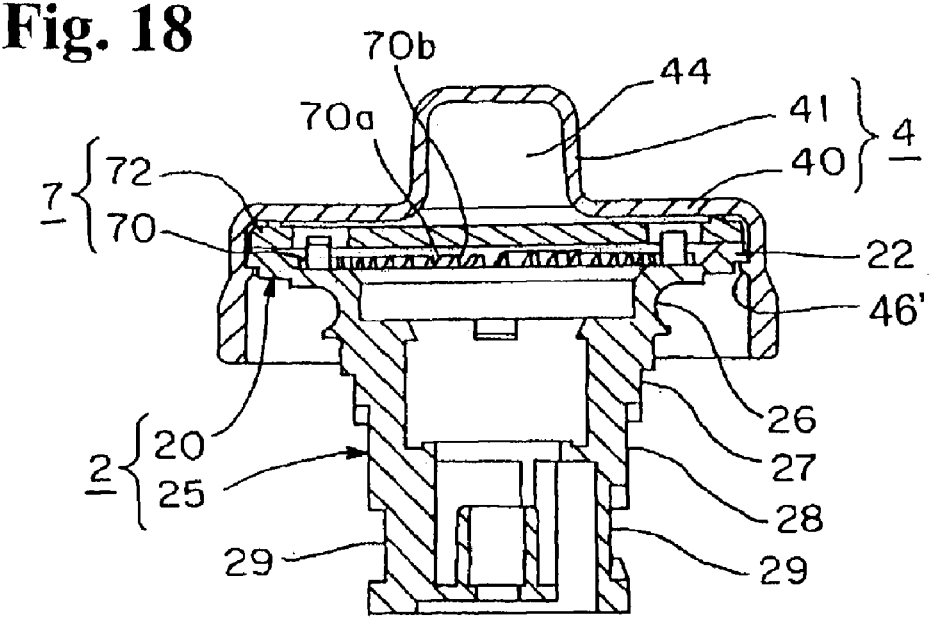
FIG. 18 is a sectional view showing a structure of a latch mechanism shown in FIGS. 14(*a*) to 14(*c*)

As for the second embodiment, FIGS. 14(*a*)–14(*c*) correspond to FIGS. 1(*a*)–1(*c*), wherein FIG. 14(*a*) is a front view of the cap device, FIG. 14(*b*) is a sectional view thereof taken along line 14(*b*)—14(*b*) in FIG. 14(*a*), and FIG. 14(*c*) is a bottom view thereof. FIGS. 15(*a*), 15(*b*) correspond to FIGS. 2(*a*), 2(*b*), wherein FIG. 15(*a*) is a vertical sectional view of the cap device, and FIG. 15(*b*) is a vertical sectional view in a state right before the cap device engages the tank-side opening through the increased tightening. FIG. 16 is an exploded perspective view showing constituent members corresponding those in FIGS. 3 and 4. FIGS. 17(*a*), 17(*b*), 17(*c*) are schematic views showing operations of a cam mechanism, and FIG. 18 is a sectional view showing a structure and operations of a latch mechanism.

In the following description, common portions of the first and second embodiments will be explained first. Then, the structure and operations of the first embodiment and different portions and operations of the second embodiment will be explained in this order. Incidentally, in order to omit repeated explanations, the same numerals or symbols in the drawings are assigned to the same or similar members and positions of the first and second embodiments.

A cap device 1 (hereinafter referred to "device 1") of each embodiment is used for a fuel tank installed in an automobile and so on. The device 1 is attached to or detached from a tank-side opening 94 when the fuel is supplied. As a basic structure, a main portion 2 is formed of an upper flange portion 20 and a shaft portion 25 disposed at a lower portion of the flange portion 20. An operation cover 4 is assembled to the upper flange portion 20, and a sealing member 11 is mounted to an upper periphery of the shaft portion 25.

The shaft portion 25 is inserted into the tank-side opening portion 94 and rotated by a predetermined angle with the cover 4. A rotational angle t is set at an angle less than 180°, for example, in the first embodiment, the rotational angle t is set at 45° as shown in FIG. 13(*b*), and in the second embodiment, the rotational angle t is set at 60° as shown in FIG. 17(*c*). The sealing member 11 is pressed against an opening edge 94*a*, and engaging projections 51 on the shaft portion 25 side engage the engaging portions 96 of the opening portion 94 through the increased tightening to thereby mount the cap. This feature of the present invention is the same as that of the conventional system, i.e. a bayonet system in which the cap is attached or detached through rotation by a predetermined angle.

The features of the invention can be seen in an engaging-disengaging structure, a connecting mechanism and a cover rotating structure. In the engaging-disengaging structure, the main portion 2 is provided with the projections 51, and includes a movable member 5 movable vertically through a cam mechanism 3. The projections 51 engage or disengage from the tank-side engaging portions 96 while the movable member 5 moves with respect to the shaft portion 25 through the cam mechanism 3. In the first embodiment, the connecting mechanism 6 is provided in the cover 4 and the upper flange portion 20. In the second embodiment, the cover rotating structure is operated through a latch mechanism 7. Therefore, in the following explanation, these features different from the prior art will be mainly explained.

The cam mechanism 3 includes a cam groove portion 29, a cam projection 53, and a coil spring 12 as an urging member. The connecting mechanism 6 includes a gear plate 45 disposed on the cover 4, a connecting plate 60 disposed on the upper flange portion 20 and a spring member 13 formed in a coil shape. The latch mechanism 7 is formed of a claw plate 72 disposed on the cover 4 and latch teeth 70 disposed on the upper flange portion 20. While a material of the constituent members is not limited, in the embodiments, the main portion 2, cover 4, movable member 5, gear plate 45, connecting plate 60 and claw plate 72 are made of a resin; the coil spring 12 and spring member 13 are made of metal; and the sealing member 11 is made of a synthetic or natural rubber. While the tank-side opening portion 94 is made of metal, the opening portion 94 may be made of a resin or may have a double structure made of metal and a resin.

Also, the device 1 has a valve mechanism V in the main portion 2 as in the conventional device. The valve mechanism V is designed to maintain an inner pressure within a certain range when the inner pressure of the fuel tank becomes outside a designed range. Incidentally, in the first embodiment, to avoid complicated drawings, the valve mechanism V is omitted. Actually, the valve mechanism V is provided in the device of the first embodiment as that of the second embodiment.

Figure 12A:
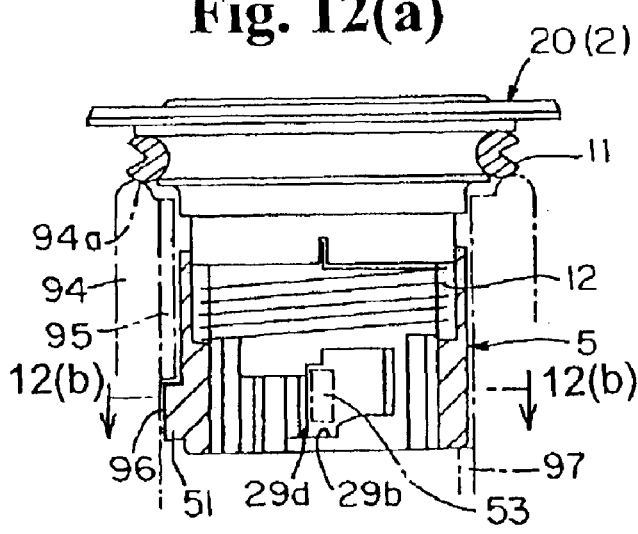
FIGS. 12(*a*) to 12(*b*) are drawings for explaining the cam mechanism of the cap device.
Figure 12B:
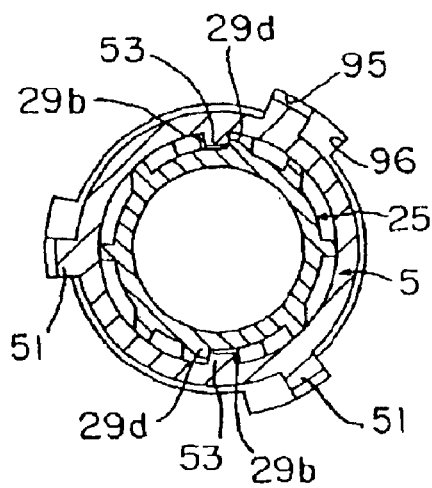

The tank-side opening portion 94 is a fuel-supply port for supplying the fuel from outside. In the embodiments, as shown in FIGS. 4 and 16, the edge 94*a* of the opening portion 94 is formed of a tapered surface or the like, and the sealing member 11 is pressed against the edge 94*a*. In the inner surface of the opening portion 94, there are provided insertion notches 95 formed in a vertical groove shape, engaging portions 96 formed in a horizontal groove shape and communicating with a part of the insertion notches 95, and a plurality of facing ribs 97. The insertion notches 95 allow the projections 51 to move smoothly downward therethrough. A step surface, i.e. an upper end surface, of the engaging portion 96 serves as an engaging surface. As shown in FIG. 12(*a*), the facing ribs 97 receive the main portion 2 by abutting against a lower end of the movable member 5 when the main portion 2 (device 1) is inserted in the opening portion 94.

In the first embodiment, the cam mechanism 3 and the connecting mechanism 6 are provided as the essential mechanisms. The cam mechanism 3 is disposed between the shaft portion 25 and the movable member 5 in the main portion 2. The cam mechanism 3 is formed of the cam groove portions 29 and the cam projections 53 fitted with each other, and a spring member 13 for urging the movable member 5 downward to thereby allow the shaft portion 25 to move vertically with respect to the movable member 5 when the cover 4 is operated to attach or detach the cap.

The connecting mechanism 6 is formed of the gear plate 45 and the connecting plate 60 provided between the upper flange portion 20 of the main portion 2 and the cover 4. When the cap is attached or detached, or the cap is in the attached state, the connecting mechanism 6 switches between a non-connecting mode in which the cover 4 rotates idly relative to the main portion 2 and a connecting mode in which the cover 4 rotates with the main portion 2, depending on whether there is a downward pressure against the cover 4 relative to a rotational torque in a cover opening direction through the connecting mechanism 6.

The cam mechanism 3 and the connecting mechanism 6 can be operated independently. Therefore, the cam mechanism 3 and the connecting mechanism 6 can be employed to the conventional cap device separately. In the present embodiment, since the cam mechanism 3 and the connecting mechanism 6 are employed at the same time, the operation is improved when the device 1 is detached from the tank-side opening portion 94.

The shaft portion and the movable member will be explained with reference to FIGS. 2(*a*), 2(*b*), FIG. 4, FIGS. 11(*a*) and 11(*b*). The movable member 5 has a cylindrical shape, and is provided with the projections 51 on an outer periphery 50 and the cam projections 53 on an inner periphery 52. The projections 51 are located at three locations on a lower part of the outer periphery 50 with an equal space therebetween. An upper inner periphery 52*a* of the inner periphery 52 has a diameter slightly larger than that of an inner periphery 52*b*. An engaging groove 54 for a spring is formed on the lower inner periphery 52*b*, and extends downwardly from an edge of the lower inner periphery 52*b* contacting the upper inner periphery 52*a*. Also, the cam projections 53 are disposed on the lower inner periphery at positions shifted by about 180° with each other. The respective cam projections 53 have the same shape, i.e. a vertically elongated rectangle.

The main portion 2 has a substantially cylindrical shape, and includes the upper flange portion 20 on the upper edge thereof and the shaft portion 25 as a lower portion below the upper flange portion 20. The shaft portion 25 is formed of a peripheral groove 26 with a maximum diameter for the sealing member and a sliding cylindrical portion 28 with a minimum diameter for the movable member. The peripheral groove 26 is positioned at a lower base of the upper flange portion 20, and the sealing member 11 is mounted thereto with a predetermined tension. The sealing member 11 has a large thickness and a C-shape section. The section of the sealing member may be a shape of O or W.

A step cylindrical portion 27 is formed between the peripheral groove 26 and the sliding cylindrical portion 28. The step cylindrical portion 27 is provided with the engaging groove 27*a* for the spring facing the sliding cylindrical portion 28. The sliding cylindrical portion 28 is provided with the cam groove portions 29 on the lower outer peripheral surface thereof. The respective cam groove portions 29 have the same shape and are positioned at positions shifted by about 180° with each other. The grooves 29 include an introducing groove 29*a*, a stand-by groove 29*b* and a sliding groove 29*c* in this order from the left side to the right side in FIG. 4. Also, vertical lengths of the respective grooves are slightly larger than that of the projections 51.

The introducing groove 29*a* communicates with a lower end of the sliding cylindrical portion 28, and the cam projection 53 is inserted in the introducing groove to communicate with the stand-by groove 29*b*. A stopping vertical rib 29*d* is provided between the introducing groove 29*a* and the stand-by groove 29*b*. The vertical rib 29*d* controls the cam projection 53 not to return to the introducing groove 29*a* from the stand-by groove 29*b*. The sliding groove 29*c* has a lower edge higher than the stand-by groove 29*b* by one step. The one step is a distance by which the movable member 5 moves vertically with respect to the shaft portion 25, and is suitably set in a range of about 2–4 mm.

In the shaft portion 2, the movable member 5 is assembled together with the coil spring 12. In assembly, the coil spring 12 is inserted into the cylindrical movable member 5 while the lower end 12*a* thereof engages the engaging groove 54. Then, the shaft portion 2 is inserted into the cylinder of the movable member 5 while being inserted into the inner periphery of the coil spring 12. At that time, the upper end 12*b* of the coil spring 12 engages the engaging groove 27*a*, and the cam projection 53 fits into the stand-by groove 29*b* by forcedly passing through the vertical rib 29*d* from the introducing groove 29*a*. Thus, the movable member 5 is assembled to move vertically relative to the shaft portion 2 with an operation of the cam mechanism 3 formed of the engagement between the cam projection 53 and the cam groove portion 29, and the coil spring 12.

The cam mechanism 3 is operated when the main portion 2 is attached to or detached from the tank-side opening portion 94 through the engagement or disengagement between the projections 51 and the tank-side engaging portions 96. Here, the cam operation upon the engagement and disengagement will be explained in detail with reference to FIGS. 11(*a*)–13(*b*). The relationship between the cam mechanism 3 and the cover 4 will be explained in the operation of the connecting mechanism 6.

FIGS. 11(*a*), 11(*b*) show a state that the main portion 2 (device 1) is removed from the tank-side opening portion 94. The main portion 2 is in a state that the movable member 5 moves downward to the maximum point with respect to the main portion shaft portion 25 by the urging force of the coil spring 12. In the sliding cylindrical portion, the cam projections 53 are positioned at the stand-by grooves 29*b* of the cam portion 29. In this state, for example, when the main portion 2 is pressed downward, the main portion 2 moves slightly downward while compressing the coil spring 12. The main portion 2 moves by a distance equal to the one step by which the cam projection 53 moves from the stand-by groove 29*b* to the sliding groove 29*c*.

FIGS. 12(*a*), 12(*b*) show a state that the main portion 2 is inserted into the tank-side opening portion 94. That is, when the projections 51 fit in the insertion notches 95 at the inner side of the opening portion, and the projections 51 are inserted into the opening portion 94, the main portion 2 moves downward until the main portion contacts the facing ribs 97. When the main portion 2 contacts the facing ribs 97, the movable member 5 moves slightly upwards relative to the main portion shaft portion 25 by its own weight against the urging force of the coil spring 12. Through the movement, the cam projection portions 53 move to the upper side of the stand-by grooves 29*b*. Then, when the main portion 2 is rotated in the cap closing direction (hereinafter referred to simply as "closing direction"), the cam projection portion 53 can slide form the stand-by groove 29*b* to the sliding groove 29*c* along with the rotation. Thus, the movable member 5 does not rotate during the insertion of the main portion 2 toward the facing ribs 97, thereby preventing the cap from being incompletely tightened. Also, the respective projections 51 are disposed to face the horizontal groove entrances of the corresponding engaging portions 96. Accordingly, when the main portion 2 is slightly rotated in the closing direction, the main portion is in an initial engaging state in which the projections 51 enter the entrances of the engaging portions.

FIGS. 13(*a*), 13(*b*) show a cap mounted state after the main portion 2 is finally engaged during a process from the initial engagement state as described above to the final engagement state. The initial engagement state is a state that the projections 51 enter the entrances of the engaging portions 96 when the main portion 2 rotates in the closing direction. While the main portion 2 is engaged and does not come off, the sealing member 11 contacts the edge 94*a* in a less compressed state.

Incidentally, in the sealing structure of this type, unless the sealing member 11 is pressed against the edge 94*a* so that the sealing member 11 is deformed to a predetermined degree, it is difficult to obtain the designed sealing ability with respect to the opening portion 94. That is, when a distance between the projections 51 and the lower end surface of the sealing member 11 in FIG. 12(*a*) is given as L1, and a distance between the projections 51 and the lower end surface of the sealing member 11 in FIG. 13(*a*) is given as L2, a difference (L1–L2) must be larger than 2 mm in order to obtain the sufficient sealing ability.

Therefore, in the conventional mounting operation, the rotational torque of the main portion 2 becomes the maximum during the process from the initial engagement state to the final engagement state. The cam mechanism 3 of the invention greatly reduces the maximum torque as opposed to the conventional one. In the structure of the present invention, when the main portion 2 is rotated through the operation portion 4 (described later), the main portion 2 moves downward while rotating with respect to the movable member 5 (which is already engaged with a part of the engaging portions 96) and compressing the coil spring 12. The downward movement of the main portion 2 is carried out through the cam mechanism 3 when the cam projections 53 on the movable member 5 move from the stand-by groove 29*b* of the sliding groove 29*c* to the final groove.

In other words, when the main portion 2 moves to the final engagement state shown in FIG. 13(*a*), the cam mechanism 3 allows the main portion 2 to move downward through the cam operation of the movable member 5 and the cam projections 53 with the cam groove portions 29. Therefore, even if the distance (L1–L2) is designed to be a large number, the main portion can be operated smoothly with a less force as compared with the conventional one. The same effect is obtained when the main portion 2 (device 1) is removed by the reverse rotation. When the main portion 2 is rotated in the opening direction through the cover 4 from the state shown in FIGS. 13(*a*), 13(*b*) while being pressed, the main portion 2 smoothly returns to the state shown in FIGS. 12(*a*), 12(*b*). When the main portion 2 is extracted from the opening portion 94, the main portion 2 is in the state shown in FIGS. 11(*a*), 11(*b*). Thus, the cap device 1 can be easily attached and detached from the opening portion 94, so that even a person such as a woman or elderly person can easily open and close (attach and detach).

Next, the upper flange portion and the cover will be explained with reference to FIG. 3 and FIGS. 5(*a*)–7(*b*). The upper flange portion 20 is positioned at an upper end side of the main portion 2, and includes a depressed portion 21 disposed on the center thereof and communicating with the inner periphery of the shaft portion 25. The depressed portion 21 has a wide flange on an upper side thereof. On the upper side of the depressed portion 21, there are provided an attaching rib 22 projecting at an outer periphery of the upper side; a pair of controlling ribs 23 projecting at an upper edge of the depressed portion 21 and extending downward along an inner periphery of the depressed portion 21; and through-holes 24 disposed at four positions between the attaching rib 22 and the control ribs 23.

The cover 4 has a substantially cap shape, and includes a protruded portion 41 provided at an upper edge of the cylindrical portion 40 to be held with fingers to operate. As shown in FIG. 2(*a*), inside the cover, a cylindrical portion 43 is provided at the middle of the central portion, i.e. a portion corresponding to the protruded portion 41, and both sides of the central portion are formed as recess portions 44. An upper surface of the cylindrical portion 40 is divided into two portions with the cylindrical portion 43 and the recess portions 44 in between. A pair of engaging ribs formed in the circular arc shape (not shown, similar to the ribs in FIG. 18) is provided on the respective upper inner surfaces. A plurality of engaging ribs 46' is disposed on a concentric circle toward the center on the inner periphery of the cylindrical portion 40.

A connecting plate 60 and a gear plate 45 constituting the connecting mechanism 6 are disposed between the upper flange portion 20 and the cover 4. As shown in FIGS. 6(*a*)–6(*c*), the connecting plate 60 includes a lower piece portion 61 with both ends upwardly raised to be inserted into the depressed portion 21; a ring shape outer peripheral portion 62 connected to the ends of the lower piece portion 61; openings 63 formed of relatively large openings vertically passing through the outer peripheral portion 62; and engaging pieces 65 with a part connected to the outer peripheral portion 62 and extending to the openings 63. A cylindrical connecting portion 64 projects at the center of the lower piece portion 61. A small projected portion 64*a* is provided on the upper surface of the connecting portion 64.

The outer peripheral portion 62 has a width to be housed in a space between the attaching rib 22 and controlling rib 23 of the upper flange portion 20, and four connecting claws 62*a* are provided at positions equally spaced on a concentric circle on the upper surface. As shown in FIG. 6(*b*), the connecting claw 62*a* has an inclined surface (an abutting surface when the connecting claw 62*a* enters the depressed portion 49) toward the cap opening direction (hereinafter referred to simply as "opening direction"), and a vertical surface (an abutting surface when the connecting claw 62*a* enters the depressed portion 49) toward the closing direction.

The openings 63 and engaging pieces 65 are disposed on both sides of the lower piece portion 61. Each of the engaging pieces 65 is formed in a cantilever shape extending in the opening 63. A base portion 66 of the engaging piece is connected to the outer peripheral portion 62, and a circular-arc swing piece 67 is formed between the base portion 66 and a forward end 68. The swing piece 67 is connected between a wide portion of the forward end 68 and a wide portion on the base portion 66. A projected portion 69 projects at the middle of an inner surface toward the center.

The connecting plate 60 is assembled to the upper flange portion 20 in a state that the lower piece portion 61 is inserted into the depressed portion 21 and the outer peripheral portion 62 fits in a space between the attaching rib 22 and the controlling rib 23. In the assembled state, the engaging piece 65 is difficult to swing in a radial direction, since the base portion 66 (outer peripheral surface thereof) and the forward end 68 are close to the corresponding portion of the controlling rib 23. On the other hand, the swing piece 67 is positioned in the opening 63, so that the swing piece swings easily. The engaging piece 65 swings easily downwardly as the engaging piece 65 is relatively long and supported on one end.

Figure 5A:
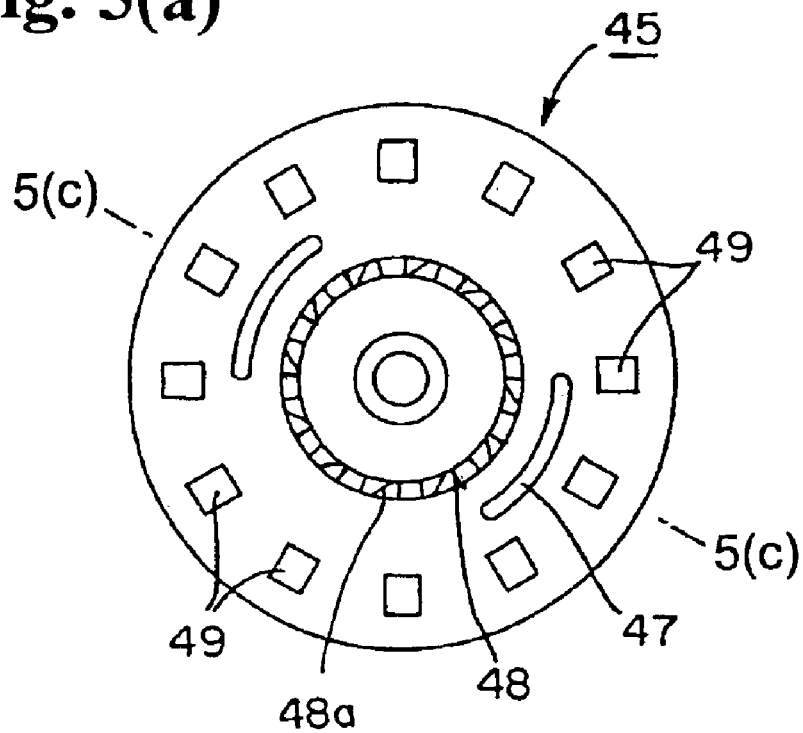
FIGS. 5(*a*) to 5(*c*) are views showing detailed portions of a rotary table shown in FIG. 3.
Figure 5B:
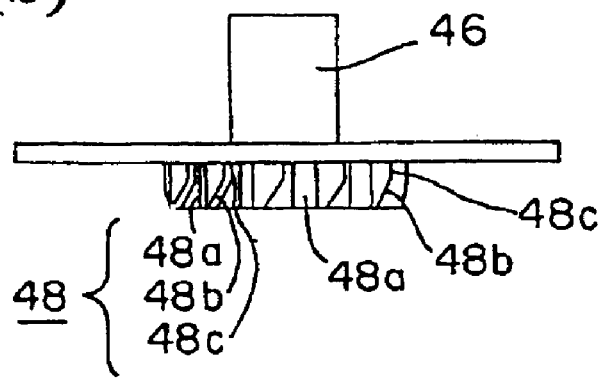
Figure 5C:
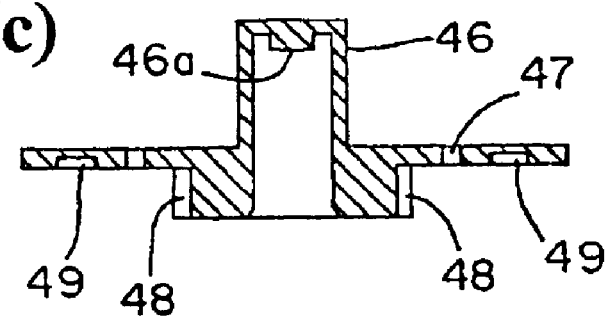
Figure 6A:
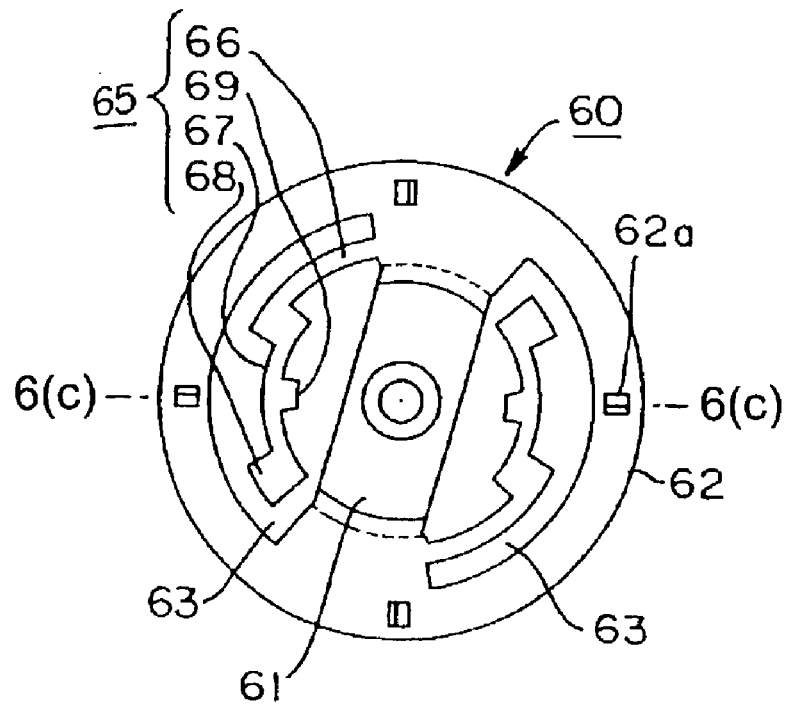
FIGS. 6(*a*) to 6(*c*) are views showing detailed portions of connecting plate shown in FIG. 3.
Figure 6B:
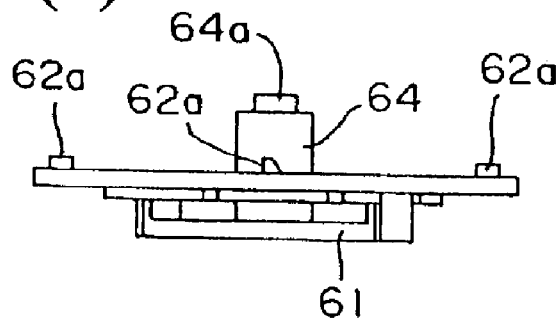
Figure 6C:
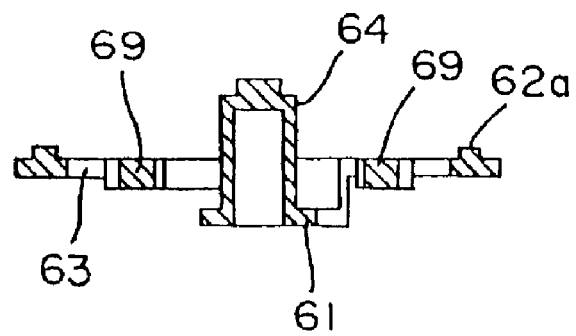

As shown in FIGS. 5(a)–5(c), the gear plate 45 has a disc shape to be disposed in the cylindrical portion 40 of the cover 4. The gear plate includes a cylindrical portion 46 projecting from an upper surface thereof; two slits 47 for engaging the engaging ribs of the cover 40; a teeth portion 48 projecting from a lower surface thereof; and a plurality of depressed portions 49 provided on an outer peripheral of the lower surface. The cylindrical portion 46 has an opening at the lower surface of the gear plate 45. A small projecting portion 46a facing the small projecting portion 64a is formed on an inner surface of an upper end of the cylindrical portion 46. The slits 47 correspond to the engaging ribs on the cover 4.

The teeth portion 48 has a substantially outer gear shape, and when the teeth portion 48 is disposed between both engaging pieces 65, the projecting portions 69 engage the respective teeth. Each tooth of the teeth portion 48 has an end surface 48a toward the closing direction (the surface abutting against the projection portion 69) gently inclined toward a valley, and an end surface toward the opening direction (the surface abutting against the projection portion 69) with a substantially inclined surface 48b at a lower side and a substantially vertical surface 48c at an upper side. The respective depressed portions 49 receive the connecting claws 62a therein with a sufficient room, and are located on a concentric circle with an equal interval therebetween.

The members described above are assembled in the following manner. First, the connecting plate 60 is attached to the upper flange portion 20 through the depressed portion 21 and the controlling ribs 23. The gear plate 45 is attached to the cover 4 in a state that the cylindrical portion 46 fits in the cylindrical portion 43 through the engagement of the engaging ribs and the slits 47. Thereafter, the cover 4 is attached to the upper flange portion 20 such that the spring member 13 is disposed between the small projecting portion 46a of the cylindrical portion 46 and the small projecting portion 64a of the connecting portion 64, and the upper flange portion side attaching rib 22 is pressed into the cover side engaging ribs 46' to engage therewith.

Figure 7A:
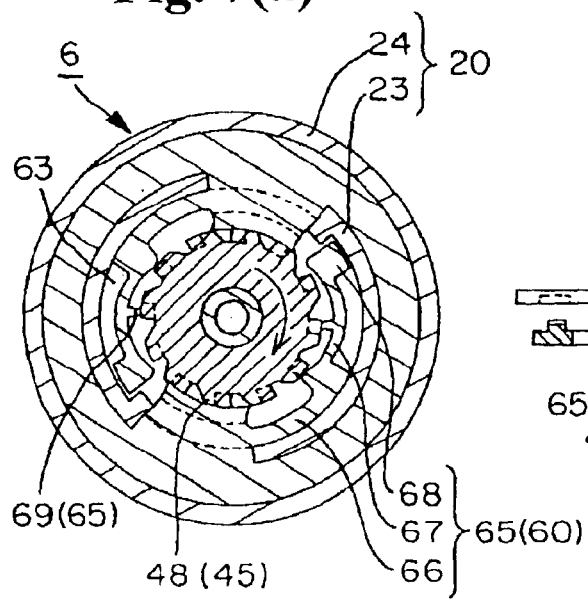
FIGS. 7(*a*) to 7(*b*) are drawings for explaining a connecting mechanism of the cap device.
Figure 7B:
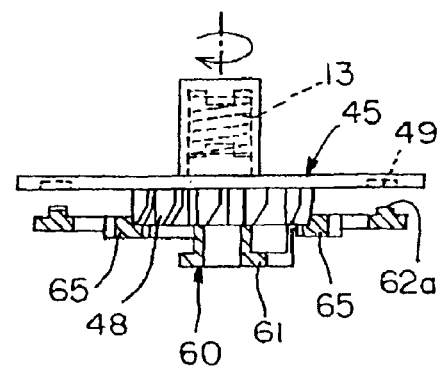

The spring member 13 urges the cover 4 and the upper flange portion 20 in a direction to separate from each other. Therefore, as shown in FIG. 7(b), the gear plate 45 is normally slightly away from the connecting plate 60, so that only a lower half of the teeth portion 48 can contact the projecting portions 69 of the engaging pieces 65.

In the connecting mechanism 6 as described above, when the cover 4 (gear plate 45) is rotated in the closing direction, each tooth (inclined surface 48a) of the teeth portion 48 engages the projecting portion 69 until a predetermined tightening force is generated (until the projections 51 finally engage the engaging portions 96) to thereby rotate the main portion 2 synchronously. When the tightening force becomes higher than the predetermined tightening force (when the final engaging state is obtained), the swing piece 67 swings in the radial direction by the stress received from the inclined surface 48a as shown in FIG. 7(a), and the projecting portion 69 sequentially gets over the inclined surface 48a of each tooth according to the swing displacement. Therefore, the cover 4 (gear plate 45) rotates idly with respect to the main portion 2. This is also applied when the cover 4 (gear plate 45) is pressed to rotate in the closing direction as shown in FIG. 8(a).

Figure 8A:
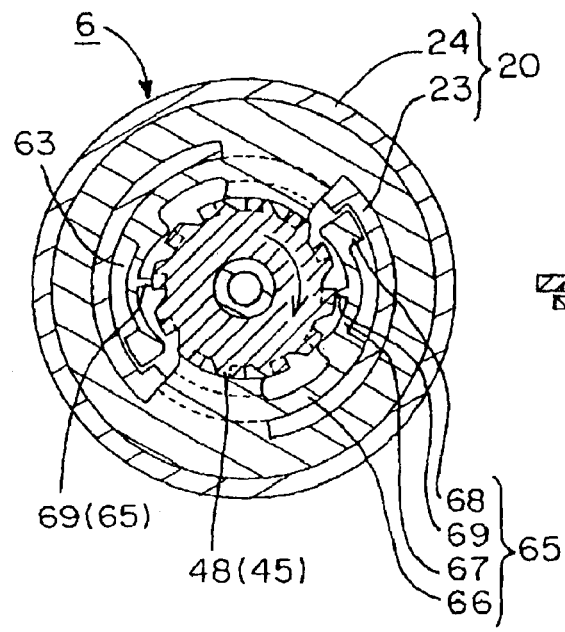
FIGS. 8(*a*) to 8(*b*) are drawings for explaining the connecting mechanism as shown in FIGS. 7(*a*) to 7(*b*)
Figure 8B:
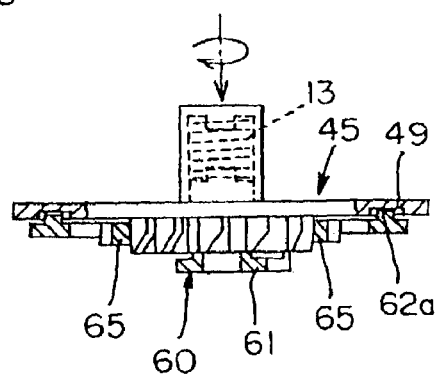

Incidentally, in the embodiment shown in FIGS. 8(a) and 8(b), the end surface corresponding to the depressed portion 49 abuts against the inclined surface of the connecting claw 62. Thus, they do not engage with each other, and the depressed portions 49 sequentially get over the connecting claws 62 to thereby allow the cover 4 to rotate idly. Thus, in the connecting mechanism 6, there is no risk of damage due to too much tightening of the cover 4.

When the cover 4 (gear plate 45) rotates in the opening direction, as shown in FIGS. 9(a), 9(b), the tooth (inclined surface 48b on the lower side) of the teeth portion 48 presses the corresponding surface of the projected portion 69 downward, so that the engaging piece 65 is displaced downward by the downward stress with the base end 66 as a supporting point. Therefore, the cover 4 rotates idly with respect to the main portion 2 accompanied with the displacement. Thus, in the connecting mechanism 6, even if the cover 4 receives an excessive outer force in the opening direction, the cover 4 does not rotate inadvertently, so that there is no risk of the projections 51 being disengaged from the engaging portions 96.

When the cap device 1 is removed from the tank-side opening portion 94, as shown in FIGS. 10(a), 10(b), the cover 4 (gear plate 45) is pressed downward to rotate in the opening direction. Then, each tooth (the upper side vertical surface 48c) of the teeth portion 48 abuts against the corresponding surface of the projected portion 59 to prevent the projected portion 59 from running away so that the cover remains connected to the main portion 2. Accordingly, the cover 4 can be rotated along with the main portion 2.

Incidentally, in the connecting mechanism 6, in addition to the engagement of the tooth (the upper side vertical surface 48c) of the teeth portion 48 and the projected portion 69, the corresponding end surface of the depressed portion 49 abuts against the vertical surface of the connecting claw 62 to engage therewith, as shown in FIG. 10(b), and the connecting state can be enhanced by the engaging force. Thus, the device 1 is detached from the opening portion 94 through the pressing and rotating operations of the cover 4 so that the projections 51 are disengaged from the tank-side engaging portions 96 through the operation of the cam mechanism 3.

In the second embodiment, the cam mechanism 3 has the different number of the projections 51, and a latch mechanism 7 is employed instead of the connecting mechanism 6 in the first embodiment. The cam mechanism 3 in the second embodiment has two projections 51 in a case that the tank-side engaging portions 96 are two. The operation in the second embodiment is substantially the same as that of the first embodiment. The operations shown in FIGS. 11(a)–13(b) correspond to an operation shown in FIGS. 17(a)–17(c). FIG. 17(a) corresponds to FIGS. 12(a), 12(b). FIG. 17(b)

shows a state where the main portion 2 (device 1) is rotated by about 30° from FIG. 17(*a*). FIG. 17(*c*) shows the final engagement state that the main portion 2 (device 1) is rotated by further 30° from the state of FIG. 17(*b*), which corresponds to the state as shown in FIGS. 13(*a*), 13(*b*). Since the descriptions of the cam mechanism in the first embodiment are substantially applied to these operations, the descriptions therefor are omitted.

Figure 19A:
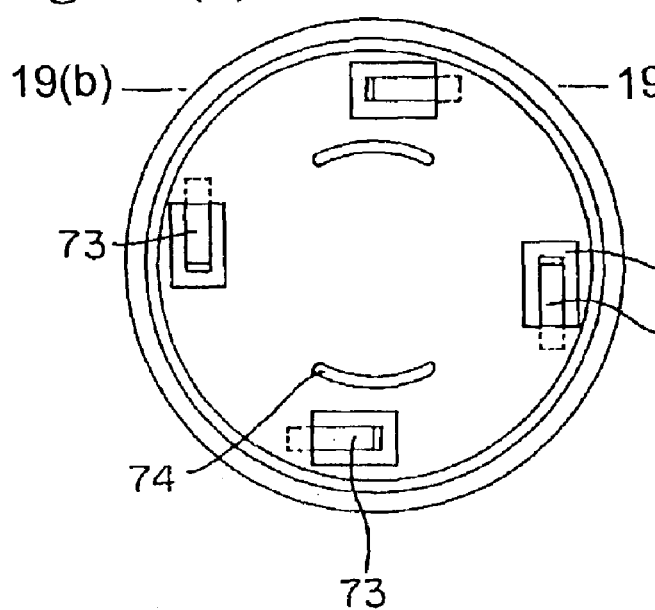
FIGS. 19(*a*) and 19(*b*) are drawings for explaining the latch mechanism shown in FIGS. 14(*a*) to 14(*c*)
Figure 19B:
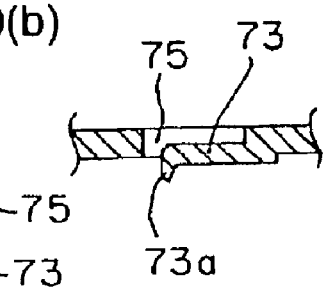
Figure 20A:
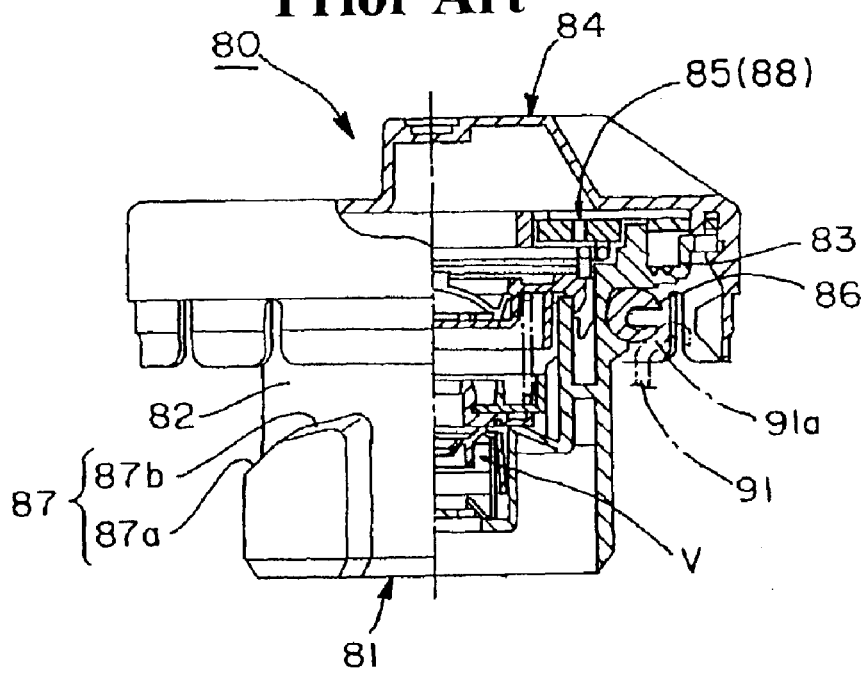
FIGS. 20(*a*) and 20(*b*) are views showing a conventional cap device.
Figure 20B:
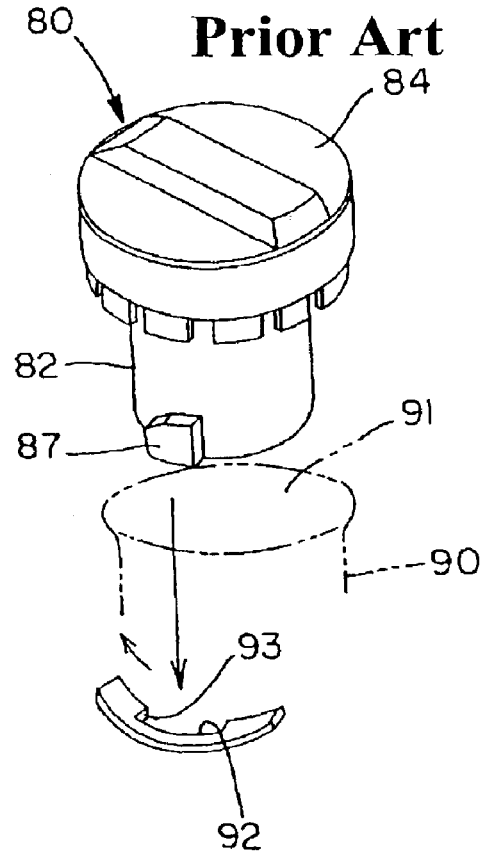

The latch mechanism 7 has the following structure. The upper flange portion and the cover will be explained with reference to FIGS. 16, 18, and 19(*a*)–19(*b*). The upper flange portion 20 is positioned at the upper end of the main portion 2, and includes the depressed portion 21 provided on the center thereof and communicating with the inner periphery of the shaft portion 25. The upper side of the depressed portion 21 is formed in a wide flange shape. On the flange portion, there are provided an attaching rib 22 projecting on the outer periphery of the upper surface, and a plurality of upright teeth 70 continuously disposed concentrically inside the attaching rib 22. As shown in FIG. 18, all the upright teeth 70 are formed in the same shape, and have an inclined end surface 70*a* (the surface abutting against the claw 73*a*) toward the closing direction, and a vertical end surface 70*b* (the surface abutting against the claw 73*a*) toward the opening direction.

The cover 4 includes the protruded portion 41 disposed on the upper surface of the cylindrical portion 40, and the protruded portion 41 can be held by fingers to operate. The inside of the cylindrical portion 40 is divided into two parts with the depressed portion 44 corresponding to the protruded portion 41 in between. A pair of circular arc engaging ribs is provided in the upper inner surface. A plurality of engaging ribs 46' is provide on an inner periphery of the cylindrical portion 40 and extending toward the center. A claw plate 72 is attached to the cover 4.

The claw plate 72 is formed in a disc shape to be disposed inside the cylindrical portion 40 of the cover 4. The claw plate includes elastic claws 73 corresponding to the upright teeth 70 and two slits 74 to engage the engaging ribs. The elastic claws 73 are provided on a concentric circle. Each of the elastic claws 73 is an elastic piece partitioned through a U-shaped slit 75, and has a claw 73*a* projecting downward from the forward end side thereof as a swing end.

In assembling the above-described parts, first, the claw plate 72 is attached to the cover 4 through an engagement between the engaging ribs and the slits 74. Thereafter, the cover 4 is attached to the upper flange portion 20 by pushing the attaching rib 22 into the cover-side engaging ribs 46' to engage therewith. In the assembled state, the claws 73*a* of the elastic claws 73 fit in a space between the upright teeth 70 of the upper flange portion 20.

In the latch mechanism 7, when the cover 4 is rotated in the closing direction, the claw 73*a* of the elastic claw 73 engages the corresponding upright tooth 70 (the inclined surface of the tooth 70) to synchronously rotate the main portion 3 until a predetermined tightening force is generated (until the projections 51 are in the final engagement state with respect to the engaging portions 96). When the tightening force becomes larger than the predetermined tightening force (when the projections 51 are in the final engaging state with respect to the engaging portion 96), as in the first embodiment, the elastic claw 73 swings upward by the stress received from the inclined surface of the corresponding upright tooth 70, and the claw 73*a* sequentially gets over the inclined surfaces of the upright teeth 70 accompanied by the displacement. Therefore, the cover 4 rotates idly with respect to the main body 2.

When the device 1 is removed from the opening portion 94, the cover 4 is rotated in the opening direction. Then, the cover 4 is rotated in the opening direction in association with the main portion 2 while the cover 4 remains in a state connected to the main portion 2 through the engagement between the upright tooth 70 (vertical surface of the tooth 70) and the claw 73*a* of the elastic claw 73. Although the operation of the latch mechanism 7 as described above has been known, in the present structure, there are such advantages that the number of the members is reduced. Further, when the operation is carried out in the closing direction, click feeling can be obtained. Also, the present embodiment demonstrates that the combination of the cam mechanism 3 and the connecting mechanism 6 is not vital, and the combination of the cam mechanism 3 and the latch mechanism 7 is also applicable.

Incidentally, the present invention is not limited to the above-described embodiments. For example, the main portion 2, cover 4, movable member 5 and so on are not limited to the shapes described above. The shapes of the projections 51 and engaging portions 96 may be changed based on their functions. Also, the present invention may be applied to an object other than the fuel tank installed in a car.

As described above, according to the present invention, in the first aspect, the movable member is provided to move vertically through the cam mechanism. Therefore, even if the tightening engaging force of the engaging portion in the cap device is increased with respect to the engaging portion of the tank-side opening, the device 1 can be attached or detached with a less force when compared with the conventional device, thereby improving the usability. According to the third aspect, since the cover rotates idly with respect to the main portion through the connecting mechanism in the cap mounted state, there is no possibility of releasing the engagement of the tank-side opening portion by an excessive outer force inadvertently given to the cover, nor causing the fuel leakage to thereby improve the security and reliability.

While the invention has been explained with reference to the specific embodiments of the invention, the explanation is illustrative and the invention is limited only by the appended claims.

What is claimed is:

1. A cap device for a fuel tank comprising:
   an operation portion,
   a shaft portion extending from the operation portion to be inserted into an opening of the fuel tank,
   a sealing member disposed on the shaft portion for sealing the opening,
   a movable member disposed over the shaft portion and having an engaging portion for engaging the opening of the fuel tank to fix the cap device to the fuel tank, and
   a cam mechanism disposed between the shaft portion and the movable member for allowing the shaft portion to move vertically and rotationally relative to the movable member by an actuation of the operation portion so that the engaging portion of the moving member engages with and disengages from the opening of the fuel tank according to a vertical and rotational movement of the shaft portion relative to the movable member through the cam mechanism, wherein the cam mechanism includes a cam groove formed in one of the shaft portion and the movable member and sized to allow the shaft portion to move vertically independent of the movable member, a cam projection formed in the other of the shaft portion and the movable member for fitting in the cam groove, and an urging member disposed between the shaft portion and the movable member for urging the movable member downward.

2. A cap device according to claim 1, wherein said operation portion includes a cover rotatable relative to a flange of the shaft portion, and a connecting mechanism disposed between the flange and the cover for selectively connecting the cover to the shaft portion, said connecting mechanism switching the cover between a non-connecting mode in which the cover rotates separately from the shaft portion and a connecting mode in which the cover rotates with the shaft portion depending on whether the cover is pressed downward with a specific force while the cover rotates in an opening direction.

3. A cap device for a fuel tank comprising:

a main body having a flange at an upper side thereof, a sealing member disposed below the flange of the main body for sealing an opening of the fuel tank, an engaging portion disposed under the sealing member for engaging the opening of the fuel tank to fix the cap device to the fuel tank, an operation portion disposed on the flange of the main body, and having a cover rotatable relative to the flange, and a connecting mechanism disposed between the flange and the cover for selectively connecting the cover to the main body, said connecting mechanism switching the cover between a non-connecting mode in which the cover rotates separately from the main body and a connecting mode in which the cover rotates with the main body depending on whether the cover is pressed downward with a specific force while the cover rotates in an opening direction, wherein said connecting mechanism includes a teeth portion having at least one tooth with a first inclined surface facing the downward direction and a second inclined surface facing opposite the opening direction, and a cam mechanism including an introducing groove for introducing a cam projection of a movable member, a stopping vertical rib, a stand-by groove, and a sliding groove in this order, said stopping vertical rib assisting for holding the cam projection in the stand-by groove.

4. A cap device according to claim 3, wherein said connecting mechanism further includes an engaging piece disposed on the flange for engaging the teeth portion, and a spring member disposed between the cover and the flange for urging the teeth portion away from the flange.

5. A cap device according to claim 4, wherein said engaging piece includes a projected portion for engaging a corresponding part of the teeth portion.

6. A cap device according to claim 4, wherein said connecting mechanism further includes a connecting plate attached to the flange portion and having the engaging piece for releasing the projected portion from the teeth portion by allowing the engaging piece to swing when the cover is in the non-connecting mode or the cover rotates in a closing direction with a rotational torque higher than a predetermined value.

7. A cap device according to claim 3, wherein said cover is in the non-connecting mode when the cover is not pushed relative to the flange to abut against the flange.

8. A cap device for a fuel tank comprising:

an operation portion, a shaft portion extending from the operation portion to be inserted into an opening of the fuel tank, a sealing member disposed on the shaft portion for sealing the opening, a movable member disposed over the shaft portion and having an engaging portion for engaging the opening of the fuel tank to fix the cap device to the fuel tank, and a cam mechanism disposed between the shaft portion and the movable member for allowing the shaft portion to move vertically and rotationally relative to the movable member by an actuation of the operation portion so that the engaging portion of the moving member engages with and disengages from the opening of the fuel tank according to a vertical and rotational movement of the shaft portion relative to the movable member through the cam mechanism, wherein the cam mechanism includes an introducing groove for introducing a cam projection of the movable member, a stopping vertical rib, a stand-by groove to prevent a rotation of the movable member during at least a portion of an insertion of the shaft portion into an opening of the fuel tank, and a sliding groove in this order, said stopping vertical rib assisting for holding the cam projection in the stand-by groove.

* * * * *